United States Patent Office 3,833,505
Patented Sept. 3, 1974

3,833,505
SILICONE FLUIDS USEFUL AS
HYDRAULIC FLUIDS
Edgar D. Brown, Jr., Schenectady, N.Y., assignor to
General Electric Company
No Drawing. Filed May 24, 1972, Ser. No. 256,482
The portion of the term of the patent subsequent to
June 28, 1991, has been disclaimed
Int. Cl. C09l 3/00
U.S. Cl. 252—78                             18 Claims

ABSTRACT OF THE DISCLOSURE

A silicone fluid mixture useful as a hydraulic fluid and, more particularly, useful as a brake fluid comprising (a) 1 to 80% by weight of the total fluid mixture of a hydrocarbonoxy-containing polymer fluid and 20 to 99% by weight of the total fluid of a linear polymer silicone fluid of the formula,

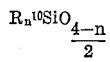

where $n$ varies from 2.0 to 3.0, $R^{10}$ is selected from monovalent hydrocarbon radicals, halogenated monovalent hydrocarbon radicals and lower cyanoalkyl radicals and the viscosity of the linear fluid varies from 20 to 500 centistokes at 25° C. There may be added to the above silicone fluid mixture various types of anti-oxidant and corrosion inhibition additives, as well as various types of rubber swell additives.

BACKGROUND OF THE INVENTION

The present invention relates to hydraulic fluids which may be used as brake fluids for automobiles and, more particularly, the present invention relates to mixtures of silicone fluids which fluids may be used as brake fluids, with or without addition of various additives.

The most popular type of brake fluids presently used commercially are glycol-based polyether fluids. One of the advantages of such glycol-based polyether fluids is their inexpensivness. However, such fluids have various disadvantages. For instance, it is desired that the brake fluid that is to be used in a vehicle have as high a flash point as possible, as well as high a boiling point as possible. It is also desirable that the fluid used as a brake fluid be chemically stable at very high temperatures such that it does not degrade or deteriorate so that it no longer performs properly as a brake fluid. Thus, although most glycol-based polyether fluids used as brake fluids have a high boiling point and a high flash point, as well as chemical stability at high temperatures, it has been found that such temperatures might be exceeded in the case when the brake system of an automobile is exposed to unduly high stress, for instance in the case of the continuous operation of the automobile and thus the braking system for many hours at unusually high ambient temperatures. It is thus possible during such periods of stress that such glycol-based polyether fluids may be exposed to temperatures above their flash point or temperatures above the boiling point of the fluid, and that at these high temperatures it is possible for such commercial brake fluids to either burst into flames or evaporate in the hydraulic system or possibly degrade chemically.

It has also been found that such commercial brake fluids are very hygroscopic so that over a period of time they have a tendency to pick up a large amount of water, sometimes as much as 12% or more by weight of water. While such amounts of water are miscible in the glycol-based polyether fluids, it is possible that at excessively high temperatures that may be created in a hydraulic brake system of an automobile that the water will vaporize creating a vapor lock in the lines of the braking system with possible failure in the operation of the brakes.

The addition of water to any type of glycol hydraulic fluid tends to inordinately increase the viscosity of that fluid at low temperatures. Thus, the addition of this large amount of water into such a hygroscopic commercial brake fluid may increase the viscosity of the fluid to such an extent that the brake system will operate very sluggishly and very inefficiently at low temperatures.

To overcome these disadvantages of the commercial glycol-based polyether fluids, there have been developed silicone fluids useful in hydraulic systems and particularly in the hydraulic system of an automobile. For one such hydraulic silicone fluid particularly useful in the brake system of an automobile, see the patent application of Edgar D. Brown, Jr., entitled "Hydrocarbonoxy-Containing Silicone Fluids Useful as Hydraulic Fluids" Docket No. 8S1–1289 filed at the same time as the present application. Such a fluid is considerably much more advantageous than the glycol-based polyether fluid as a brake fluid because of its high chemical stability at high temperatures, because of its high boiling point and thus low evaporation at high temperatures, and because of its high flash point. In addition, such a fluid has a low viscosity even at temperatures as low as −40° C. However, one of the difficulties of a silicone hydraulic fluid useful as a brake fluid as that described in the above-identified docket, is that it is somewhat expensive. Thus, there has been constant research into providing as inexpensive as possible hydraulic fluid and particularly in brake fluid.

After much experimentation, it was determined that certain linear silicone fluid polymers could be useful as hydraulic fluids and, more particularly, as brake fluids. One of the advantages of such fluids was their low hygroscopicity. However, it was found that even if minor amounts of water by accident found their way into the brake system, that such minor amounts of water might become dispersed in such silicone fluids and tended to separate out from the silicone fluid, which is undesirable.

Thus, it became necessary to produce silicone fluids compatible with a certain quantity of water that might be accidently inserted into the system. In addition, it was found that one of the necessary properties of a hydraulic brake fluid is that it swell to a minor extent the rubber portion of the braking system, which swelling of the rubber was relied upon to obtain good seals in the brake system. Thus, to give such linear silicone fluids the proper swell properties, it was necessary to develop the use of certain rubber swell additives. However, it is to be appreciated that such linear silicone fluids, in spite of the disadvantages mentioned above, were superior to the hydrocarbonoxy-containing silicone fluids and other types of silicone fluids as hydraulic fluids and particularly as brake fluids in that they have an exceptionally high flash point, chemical stability both at high and low temperatures and very high boiling points so that even at exceptionally high temperatures to which the brake system of an automobile could conceivably be exposed to, a negligible amount of such linear fluids would be evaporated. In addition, such fluids have the advantage that their viscosities, while comparable to the hydrocarbonoxy-containing silicone fluids at low temperatures, have the advantage that such viscosities vary predictably with temperature and, more especially, the viscosity of the final product as manufactured can be easily controlled.

Further, it is to be remembered that most importantly such fluids are more economical and more efficiently produced than other types of silicone fluids, such as the hydrocarbonoxy-containing silicone fluids.

Thus, it is one object of the present invention to provide for a novel silicone fluid mixture which is capable of being compatible with a reasonable quantity of water.

It is another object of the present invention to provide a novel silicone fluid mixture which has an exceptionally low freezing point which has a low viscosity at an exceptionally low temperature.

It is an additional object of the present invention to provide a novel silicone fluid mixture with the proper rubber swell properties so that it is particularly useful as a hydraulic fluid in hydraulic systems and, more particularly, useful as a brake fluid in automobile brake systems.

It is yet another object of the present invention to provide a novel silicone fluid mixture with superior chemical stability, a very high boiling point and a very high flash point, as well as superior chemical stability at high temperatures.

It is still another object of the present invention to provide a novel silicone fluid mixture which can be produced economically and efficiently.

SUMMARY OF THE INVENTION

These and other objects of the present invention are accomplished by means of a silicone fluid mixture useful as a hydraulic fluid and, more particularly, as a brake fluid comprising (a) 1 to 80% by weight of the total silicone fluid of a hydrocarbonoxy-containing polymer fluid having 0 to 100 mole percent of polymeric and monomeric units selected from $R_2Si(OM)_2$ units,

units and $R_2SiO$ units, and mixtures thereof, 0 to 100 mole percent of polymeric and monomeric units selected from $RSi(OM)_3$ units,

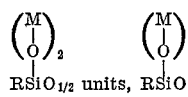

units and $RSiO_{3/2}$ units, and mixtures thereof, 0 to 10 mole percent of polymeric units selected from the class consisting of $(MO)_3SiO_{1/2}$ units, $(MO)_2SiO$ units, $MOSiO_{3/2}$ units and $SiO_2$ units, and mixtures thereof, and 0 to 5 mole percent of polymeric units of $R_3SiO_{1/2}$ units, where in each class there may be any combination of the defined units and wherein normally there is present all the units in each class in all types of combinations with each other and the units of the other classes. The molar amount of MO groups present based on the total moles of R and MO groups present may vary from 5 to 100 mole percent, the viscosity of the fluid varies from 2 to 400 centistokes at 25° C., R is selected from the class consisting of monovalent hydrocarbon radicals, halogenated monovalent hydrocarbon radicals, and cyanoalkyl radicals, M is selected from the class consisting of R—, ROR'—, ROR'OR'—, $R(OC_xH_{2x})_n$—, and

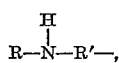

such that R is as previously defined and may be different from the R radicals attached to the silicon atoms, R' is selected from the class consisting of divalent hydrocarbon radicals and halogenated divalent hydrocarbon radicals of 2 to 20 carbon atoms, $x$ varies from 2 to 4 and $n$ is at least 5, and (b) 20 to 99% by weight of the total silicone fluid of a linear silicone fluid polymer of the formula, (I) 

where $n$ varies from 2.001 to 3.0, $R^{10}$ is selected from monovalent hydrocarbon radicals, halogenated monovalent hydrocarbon radicals and cyanoalkyl radicals and the viscosity of the linear fluid varies from 20 to 500 centistokes at 25° C.

As a pour depressant or as an additive to lower the temperature at which the above silicone fluid mixture will have a desirable viscosity at excessively low temperatures, especially at temperatures as low as —58° C., there may be added to the above fluid mixture, 1 to 20% by weight of the linear fluid polymer of a pour depressant chain silicone fluid containing 70 to 97 mole per cent of $R_2^{11}SiO$ units, 2 to 10 mole percent of $R_3^{11}SiO_{1/2}$ units and 1 to 20 mole percent of $R^{11}SiO_{3/2}$ units, wherein the viscosity of the branched chain fluid varies from 5 to 100 centistokes at 25° C. and $R^{11}$ is selected from the class consisting of monovalent hydrocarbon radicals, halogenated monovalent hydrocarbon radicals and lower cyanoalkyl radicals. To the above silicone fluid there may be added 1 to 5% by weight of the total silicone fluid of a rubber swell additive such as dioctyl azelate, dioctyl adipate and dioctyl sebacate. There may be also added to said silicone fluid mixture at a concentration of 0.05 to 2% by weight of the fluid mixture of an anti-corrosion additive such as zinc salts of naphthenic acid and other types of naphthenate compounds. In addition, various types of anti-oxidant compounds may be added.

The above silicone fluid mixture, irrespective of its form, has been found to be especially suitable for use as a brake fluid. However, it is not intended to limit the application in the present specification of the silicone fluid mixture defined above to use just in the hydraulic system of an automobile or other type of vehicle. More broadly, the silicone fluid mixture of the present invention is directed to a suitable use as a hydraulic fluid in any hydraulic system. In the more specific preferred embodiment of the present invention, the silicone fluid mixture defined above, with or without the various additives, is particularly suitable for use in the hydraulic brake system of an automobile, truck or other such type of vehicle. Such an automotive vehicle will contain as part of its brake system a hydraulic reservoir, a brake drum cylinder with the necessary pistons therein or the comparable equipment to be found in a disc brake system, and in addition, the necessary pistons and connecting links by which the operator of the vehicle applies mechanical pressure which is transferred into hydraulic pressure. The reservoir, brake drum, cylinder, pistons, as well as the equivalent disc brake appendages and the mechanical force applying equipment are all connected by the necessary hydraulic lines and other types of supplementary equipment.

To generally describe such a hydraulic brake system, in all types of vehicles irrespective of the type of vehicle, reference will simply be made to a hydraulic reservoir; to the hydraulic activating means which is the mechanical means by which an operator of a vehicle translates his physical pressure to mechanical pressure, that is, the brake pedal and the piston which it activates; to hydraulic activated means which will refer to the brake drum cylinder and the pistons therein or the equivalent disc brake system; and to hydraulic lines, that is the hydraulic lines connecting all of these parts of the hydraulic brake system together. Since the purpose of the present application is not to define or describe a novel type of brake system or a novel type of hydraulic system per se, the different types of brake systems and hydraulic systems will not be described herein in detail since the direction of the present application is to describe a novel hydraulic fluid and, more preferably, a novel hydraulic fluid as used in a hydraulic brake system.

DESCRIPTION OF THE PREFERRED EMBODIMENT

The radicals R and R' appearing in the units of the hydrocarbonoxy-containing silicone fluid are typical radicals usually associated with monovalent silicon-bonded organic groups in the case of R and are generally associated with divalent hydrocarbon radicals in the case of R'. The organic radicals represented by R include monovalent hydrocarbon radicals, halogenated monovalent hydrocarbon radicals and cyanoalkyl radicals. Thus, the radical R may be alkyl, such as methyl, ethyl, propyl, butyl, octyl; aryl radicals, such as phenyl, tolyl, xylyl, naphthyl radicals; aralkyl radicals, such as benzyl, phenylethyl radicals; olefinically unsaturated monovalent hydrocarbon radicals, such as vinyl, allyl, cyclohexyl radicals; cycloalkyl radicals, such as cyclohexyl, cycloheptyl radicals; halogenated monovalent hydrocarbon radicals, such as chloromethyl, dichloropropyl, 1,1-trifluoropropyl, cyclophenyl, dibromophenyl, and other such radicals; cyanoalkyl radicals, such as cyanoethyl, cyanopropyl, etc. Preferably, the radicals represented by R have less than 8 carbon atoms and it is particularly preferred that R be methyl, ethyl or phenyl. The various R radicals in the various types of units present in the hydrocarbonoxy-containing silicone fluid may all be the same or may be different. Further, in particular, in each type of unit the R radicals may represent different types of organic radicals. The radicals represented by R' may be any alkylene or arylene radicals of up to 20 carbon atoms and preferably from 2 to 10 carbon atoms, such as methylene, ethylene and various isomers of the phenylene radicals or substituted phenylene radicals. Preferably, R' is an alkylene radical of 2 to 10 carbon atoms, such as methylene, ethylene, etc. The preferred radical for R is lower alkyl radicals of 1 to 8 carbon atoms, such as methyl, ethyl, propyl, etc. The $R^{10}$ radicals are selected from the same radicals as the R radicals. More preferably, the $R^{10}$ radicals in a particular linear polymer silicone fluid of formula (1) are selected from lower alkyl radicals of 1 to 8 carbon atoms, such as methyl, ethyl, propyl, etc. In such a linear silicone fluid polymer there may be 50 mole percent of the $R^{10}$ radicals as phenyl radicals and a minor portion, such as 1 mole precent or less, may be vinyl radicals. In the most preferred embodiment, the $R^{10}$ radicals in the linear polymer silicone fluid of formula (1) consists solely of lower alkyl radicals, such as methyl, ethyl, etc., and most preferably methyl.

The $R^{11}$ radicals and the various units present in the pour depressant fluid, that is, the branched chain silicone fluid containing $R_2^{11}$ SiO units, $R_3^{11}SiO_{1/2}$ units and $R^{11}SiO_{3/2}$ units, are again preferably selected from lower alkyl radicals, aryl radicals, such as phenyl and lower alkenyl radicals, such as vinyl, allyl, etc. More preferably, the $R^{11}$ radicals are lower alkyl radicals of 1 to 8 carbon atoms or phenyl radicals with as much as 10 mole percent of the $R^{11}$ radicals being phenyl radicals. In the most preferred embodiment, all the $R^{11}$ radicals are selected in the pour depressant branched chain silicone fluid having lower alkyl radicals, such as methyl, ethyl, propyl, etc., with the most preferred being methyl.

As stated previously, in the most general embodiment of the hydrocarbonoxy-containing polymer fluid, there is present 0 to 100 mole percent of polymeric and monomeric units selected from $R_2Si(OM)_2$ units,

units and $R_2SiO$ units and mixtures thereof, 0 to 100 mole percent of polymeric and monomeric units selected from $RSi(OM)_3$ units,

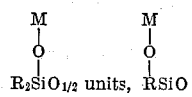

units and $RSiO_{3/2}$ units and mixtures thereof, 0 to 10 mole percent of polymeric units selected from $(MO)_3SiO_{1/2}$ units, $(MO)_2SiO$ units, $(MO)SiO_{3/2}$ units and $SiO_2$ units and mixtures thereof, and 0 to 5 mole percent of polymeric units of $R_3SiO_{1/2}$ units. Thus, although in most cases the hydrocarbonoxy fluid is a polymer, it can be a monomer or a mixture of monomers or a mixture of monomers with polymers within the scope of the above general formula. The monomers that may be present are, of course $R_2Si(OM)_2$ and $RSi(OM)_3$. Such a fluid has a viscosity generally of 2 to 400 centistokes and, more specifically, a viscosity of 7 to 20 centistokes at 25° C. This hydrocarbonoxy-containing silicone fluid broadly may have 2 to 2000 silicon atoms in the polymer chains and, more preferably, 20 to 40 silicon atoms in the silicone polymer chain. In the more preferred embodiment of the hydrocarbonoxy-containing silicone fluids there is present 75 to 95 mole percent of polymeric units selected from

units and $R_2SiO$ units, and 5 to 25 mole percent of polymeric units selected from

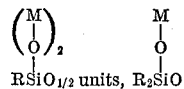

units and $RSiO_{3/2}$ units, with possible trace quantities of the other types of units defined in a more general definition of the hydrocarbonoxy-containing fluid. It should be pointed out that in this fluid the R radical appearing in the M unit may be the same or different from the R radical attached to the silicon atom. More preferably, the R radical and the M moiety is selected from lower alkyl radicals of 1 to 8 carbon atoms and, preferably, methyl. In addition, as stated previously, the radical R' is preferably selected from saturated divalent aliphatic hydrocarbon radicals of 2 to 10 carbon atoms, such as methylene, ethylene, propylene. In the most preferred embodiment, the M moiety is 2-methoxy-2-ethoxy ethylene. This particular substituent group is preferred for M since it allows the hydrocarbonoxy-containing fluid to have the highest amount of compatibility with other types of brake fluids and, particularly, glycol-based polyether brake fluids.

The process for producing the hydrocarbonoxy-containing polymer fluid is generally a hydrolysis process. However, it is also a very critical process and the hydrolysis must be carried out very carefully. In order to obtain a hydrocarbonoxy-containing silicone fluid within the scope of the above general definition, it is necessary to hydrolyze a mixture containing 0 to 100 mole percent of an organohalosilane of the formula $R_2SiX_2$, 0 to 100 mole percent of an organohalosilane of the formula $RSiX_3$, 0 to 10 mole percent of a silane of the formula $SiX_4$ and 0 to 5 mole percent of an organohalosilane of the formula $R_3SiX$, where X represents halogen and, more specifically, chlorine per mole of the organohalosilane, 0 to 1.3 moles of water. When there is present such a mixture of organohalosilanes in the hydrolysis process, there is added to the mixture of the organohalosilanes, sufficient water to replace 0 to 95 mole percent of the halogen atoms present in the organohalosilanes and, most preferably, to replace about 5 mole percent of the halogen atoms present on the organohalosilanes. In this hydrolysis process, the water is added to the organohalosilanes and halosilanes with agitation and is added slowly so as to obtain proper hydrolysis of the silanes.

In the more preferred embodiment of the hydrocarbonoxy-containing silicone fluid of the present invention, where there is present 75 to 95 mole percent of units selected from

units and R₂SiO units, and 5 to 85 mole percent of units selected from

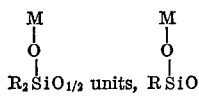

units and RSiO_{3/2} units, it is necessary to hydrolyze a mixture of silanes comprising 75 to 95 mole percent of organohalosilanes of the formula $R_2SiX_2$ and 5 to 25 mole percent organohalosilanes of the formula $RSiX_3$ such that 0 to 0.95 moles of water is added per mole of $R_2SiX_2$ and 0 to 1.4 moles of water per mole of $RSiX_3$ in the mixture.

In the most preferred embodiment and on a weight basis, there is hydrolyzed a mixture of 85 weight percent of organohalosilanes of the formula $R_2SiCl_2$ with 15 weight percent of organohalosilanes of the formula $RSiCl_3$, wherein enough water is added to replace 75 mole percent of the chlorine atoms present. In this specific, most preferred embodiment, there is usually added 0.8 mole of water per mole of the organohalosilanes. As stated previously in the case, the most preferred case is where there is a mixture comprising 85 weight percent of the organohalosilane of the formula $R_2SiX_2$ and 15 weight percent of the organohalosilane of the formula $RSiX_3$, and there is added 0.1 part of water per 1 part of the organohalosilanes mixture so as to replace approximately 75 percent of the chlorine present on the organohalosilanes. In the general embodiment of the present invention there will be formed a halogen-silicone polymer in the hydrolysis process wherein 5 to 100 mole percent of the chlorine atoms will be still present in the silicone polymer, which chlorine atoms may be reacted with the alcohols enumerated below for the purpose of substituting the hydrocarboxy group group on the silicon atoms. It should be pointed out that in this hydrolysis process all the water that is added to the organohalosilanes reacts with the organohalosilanes so as to form siloxane bonds between the silicon atoms, with hydrogen chloride being given off as the reaction by-product. In the hydrolysis process, the mixture of organohalosilanes is added to a reaction chamber and then the proper amount of water is added to the organohalosilanes over a period of 1 to 4 hours with the proper agitation. During such addition, although the hydrolysis process and the hydrolysis of the organohalosilanes is exothermic, nevertheless, due to the evolution and evaporation of the hydrogen chloride that is formed, the reaction mixture decreases in temperature to a temperature preferably below 20° C. and, more preferably, at a temperature in the range of 0 to 10° C. It is desirable to maintain a temperature of the reaction during hydrolysis below 10° C. in order to keep the organohalosilanes from boiling off.

It is desirable to remove all hydrogen chloride that is formed from the hydrolyzates since the presence even of minor amounts of hydrogen chloride in the hydrolyzate may tend to deteriorate the final polymer and the final fluid mixture to which the polymer may be added.

After the 1 to 4 hour period in which all the water is added to the organohalosilanes, then the hydrolyzate is heated to a temperature of 25° C. over a period of ½ hour, at which point the hydrolysis is complete. Then the hydrolyzate is heated to a temperature in the range of 75° C. to 100° C. and, more preferably, 25° C. to 50° C., and there is then added to the hydrolyzate a water miscible organic solvent which is inert to the silicon polymer, that is, the reaction product of the hydrolysis. Any water miscible organic solvent which is inert to the polymer may be used. Examples of such a water miscible organic solvent is xylene, toluene, hexane, heptane, octane, cyclohexane, benzene, mineral spirits and similar types of solvents. The most preferred solvent in the present process are xylene and toluene. To the resulting solution which is preferably heated to the range of 25–50° C. there is preferably added .15 to 3.0 moles per mole of organohalosilane reactant mixture, of an alcohol selected from the group

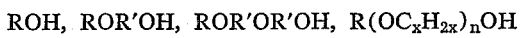

and

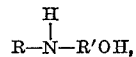

where R and R' are as previously defined $x$ varies from 2 to 4 and $n$ is at least 5 and preferably not more than 100.

Thus, when there has been added the above stated amounts of water to hydrolyze the chlorine atoms present in the organohalosilanes and in the halosilanes, there is added one of the alcohols indicated or a mixture of such alcohols indicated above to substitute an alcohol moiety for each remaining halogen atom on the silicon polymer.

It should be appreciated that the above molar quantities of alcohol indicated above for the hydrolyzate need not necessarily be adhered to since it is not necessary to use a stoichiometric amount of the alcohol to react with the silicone polymer. More preferably, 10 mole percent excess or more of alcohol may be used in the reaction. After the alcohol is added, the reaction is maintained at a temperature of 25 to 100° C. for 30 minutes to 4 hours while the solution is agitated. During the resulting condensation reaction, hydrogen chloride is given off from the reaction solution so that hydrogen chloride may be drawn off from the solution by vacuum or other means. The condensation reaction of the alcohol with the halogen atoms of the silicone polymer proceeds to completion without the use of catalysts.

It can be appreciated that the above addition reaction may also take place above 100° C., however, a temperature of 25 to 100° C. and, more preferably, 25 to 50° C. is preferred in that the reaction takes place at a suitable rate, that is a period of 30 minutes to 4 hours, without a catalyst. After the condensation reaction has been completed, then the solution is heated to a temperature in the range of 100° C. to 185° C. and, more preferably, at the reflux temperature of the solvent. At this reflux temperature of the solvent, the solvent is stripped off, preferably at a temperature just above the reflux temperature of the solvent. At this temperature, which is a stripping temperature, the solvent, the excess alcohol and any cyclic siloxanes that happen to form, are stripped off. When it is seen that all of the solvent, excess alcohol, cyclic siloxanes and other undesirable materials have been stripped off from the hydrocarbonoxy-containing silicone polymer, it may then optionally be heated to a temperature of 185° C. for 5 minutes or so, so as to remove a portion of the disiloxanes that may have been formed in the above synthesis. Although some disiloxanes are preferred in the final product, it can be appreciated that it is desirable not to have too large a quantity in the final product since such disiloxanes vaporize off from the silicone fluid at elevated temperatures and may create undesirable vapors in a hydraulic system.

The resulting hydrocarbonoxy-containing silicone fluid polymer may have a viscosity that varies in the range of 2 to 400 centistokes at 25° C. and, more usually, has a viscosity in the range of 7 to 20 centistokes at 25° C. Further, in addition, as pointed out previously, the hydrocarbonoxy-containing silicone polymer may be a mixture of polymers, which polymers may have anywhere from 2 to 2000 silicon atoms and which silicon atoms are bonded to each other by oxygen atoms. It should be pointed out that the hydrolysis process specified above is critical and particularly the amount of water that is used in the hydrolysis is critical in forming the desired hydrocarbonoxy-containing silicone polymer within the scope of the present invention. Within the more preferred hydrolysis process, there is used 0 to 2.35 moles of water per mole of a mixture of organohalosilanes containing 75 to 95 mole percent of organohalosilanes of the formula $R_2SiX_2$ and 5 to 25 mole percent of organohalosilanes of the formula $RSiX_3$.

One of the more preferred properties of the hydrocarbonoxy-containing silicone fluid is that it be not only compatible with other silicone fluids, but that it also be compatible with a glycol-based polyether fluid. Thus, when the hydrocarbonoxy-containing silicone fluid contains 37 weight percent to 48 weight percent of hydrocarbonoxy groups based on the total weight of this fluid, then such a fluid is found to be completely miscible with other silicone fluids, as well as with glycol-based polyether hydraulic fluids. When the weight percent of the hydrocarbonoxy groups in the silicone fluid is outside this range, then the miscibility with other types of fluids will not be as effective, although in most situations at least an emulsion between the hydrocarbonoxy silicone fluid and the other type of fluid will be formed.

For a more detailed description of the preparation of this hydrocarbonoxy-containing fluid, the reader is referred to the specification of Edgar D. Brown entitled "Hydrocarbonoxy-Containing Silicon Fluids Useful as Hydraulic Fluids", Docket No. 8S1-1289, filed concurrently herewith. It should be noted that the hydrocarbonoxy-containing fluid is utilized at a concentration of 1 to 80 percent by weight based on the total silicone fluid mixture with the rest of the hydraulic fluid mixture being comprised of 20 to 99 percent by weight of the linear polymer silicone fluid of formula (1) above. However, although such a fluid is useful as a brake fluid and has all the advantages enumerated above, and particularly the advantages of hydrocarbonoxy-containing fluids enumerated in the above-identified docket, it is more preferred and more economically attractive to utilize a mixture containing 5 percent to 20 percent by weight of the hydrocarbonoxy-containing silicone fluid, and in combination with 80 percent to 95 percent by weight of the total fluid of the linear polymer silicone fluid of formula (1) above. The most preferred combination is 15% by weight of the hydrocarbonoxy fluid and 05% by weight of the linear polymer silicone fluid of formula (1). It should be noted that even with general broad range of the two fluids disclosed above, that the two fluids are miscible with one another. Particularly, the more hydrocarbonoxy-containing silicone fluid there is present in combination with the linear fluid, the more the individual silicone fluid mixture is compatible with the commercial brake fluids. However, even when there is as little as 1% by weight of the hydrocarbonoxy-containing silicone fluid in combination with a 99% by weight of the linear silicone fluid, the resulting mixture is a single compatible system such that one fluid dissolves in the other or is present in emulsion form.

The linear fluid of formula (1) is prepared by a hydrolysis process wherein a mixture comprising an organohalosilane of the formula $R_2^{10}SiX_2$ and an organohalosilane of the formula $R_3^{10}SiX$ is hydrolyzed, where $R^{10}$ is as previously defined and X is selected from halogen. The $R^{10}$ radical as stated previously is preferably selected from the lower alkyl radicals, such as methyl, ethyl radicals. In the most preferred embodiment substantially all of the $R^{10}$ radicals are methyl radicals. Such a fluid can be produced very economically. It is desirable in such hydrolysis process by hydrolyzing the above two types of organohalosilanes to produce a linear polymer fluid which may have anywhere from 2 to 2,000 silicon atoms in the silicon chain, such that the final fluid has a viscosity of 20 to 500 or more, and preferably 20 to 100 centistokes at 25° C. In mixing the above organohalosilanes, in order to get the proper and desired chain length in the resulting final linear fluid polymer, it is desirable to utilize 60 to 96 mole percent of organohalosilanes of the formula $R_2^{10}SiX_2$ and 4 to 40 mole percent organohalosilanes of the formula $R_3^{10}SiX$ and to add one part of the resulting organohalosilane mixture to 3 to 6 parts of water. In this hydrolysis reaction, the organohalosilanes are added to the water. Desirably, an excess amount of water is used in addition to that required to hydrolyze completely all the halogen radicals into siloxane bonds so as to obtain complete hydrolysis of the mixture. Preferably, the organohalosilanes are added to the water over a period of time such as 30 minutes to 2 hours with agitation. Although the reaction can be carried out at room temperature and preferably some heat is utilized such that hydrolysis reaction is maintained at 40 to 70° C. Preferably, no solvent is utilized in this hydrolysis since the addition of an organic solvent will result in the formation of cyclics which are undesirable by-products in the final linear polymer product of the present invention.

After the addition of all of the water has been completed with the necessary agitation and heating, then there is formed in the hydrolysis mixture a water layer and a layer of the hydrolyzate. The water layer is drained off and then the silicone polymer product that remains is washed with water several times to remove any hydrogen chloride that may be entrapped or present in the silicone polymer. It should be pointed out that during the hydrolysis reaction, hydrogen chloride gas is continually formed and given off. The removal of such hydrogen chloride gas may be facilitated by the presence of a vacuum system which removes the hydrogen chloride gases as they are formed. However, as pointed out, there may be small amounts of hydrogen chloride still entrapped in the hydrolyzate and for this reason it is desirable to wash the hydrolyzate several times with water so as to remove as much of the hydrogen chloride as possible. Thus, using this washing procedure, there will probably be present in the final wash hydrolyzate 10 to 100 parts per million of hydrogen chloride. However, it is necessary that there be present as little hydrogen chloride as possible in the polymer, and preferably, less than 5 parts per million of hydrogen chloride in the final polymer, since the presence of this acid will degrade the polymer upon standing. So as to remove all traces of the acid, the hydrolyzate may be neutralized with a base selected from any strong alkali metal base such as sodium hydroxide, potassium hydroxide, etc., and, most preferably, by the use of a mild base such as sodium bicarbonate. Such a base is added to the hydrolyzate in slight excess so as to completely neutralize all the hydrogen chloride present in the hydrolyzate.

After the addition of the base, the hydrolyzate is preferably filtered through any common filter used to remove alkaline metal salts and other impurities from liquids. Samples of such filters are the common clay and diatomaceous earth filters, such as Celite. After the impurities and salts have been removed from the silicone fluid, it is desirable to equilibrate the fluid at an elevated temperature so as to convert most of the fluid to a certain average molecular weight so that the silicone polymer molecule will contain anywhere from about 30 to 100 silicon atoms.

Thus, to carry out such an equilibrium, there is added one of the common equilibration catalysts to the fluid which may be an acid-treated clay such as Fullers Earth, or toluene sulfonic acid or, on the other hand, may be a basic catalyst such as potassium hydroxide, sodium hydroxide, etc. The acid type of equilibration catalysts are preferred and, in particular, the acid-treated clay such as Fullers Earth, is the most preferred type of catalyst in such equilibration reaction because of the ease of removal of the acid catalyst from the liquid which it is used to equilibrate.

Preferably, there is added 1 to 2 percent by weight of the acid catalyst by weight of the silicone fluid. After the addition of the catalyst, the fluid is heated to a temperature in the range of 150° to 200° C. and, more preferably, in the range of 170° to 190° C. for a period of 2 to 6 hours. At the end of that time, the acid catalyst, if it is acid-treated clay or Filtrol, may simply be removed by filtering. In the case where a liquid catalyst is used such as toluene sulfonic acid, then the catalyst must be neutralized with one of the well known bases, such as an alkali metal hydroxide, or it may be removed by the use of a base-treated filter or one of the common types of clay filters known to be useful for this purpose. If the acid is neutralized with a base, of course, the salts that are formed are also filtered out with a diatomaceous earth or a clay type of filter. Preferably, in such an equilibration reaction, a solvent is not used and particularly one of the normal organic solvents. The presence of such a solvent will result in the formation of an unduly large amount of cyclic polysiloxanes, which, as has been stated previously, are undesirable in the final product. Nevertheless, in such equilibration there is the formation of a small amount of cyclics and to remove the cyclics it is usual to heat the resulting liquid polymer mixture to a temperature of about 200° C. and as high as 280° C. to strip out the cyclics over a period of ½ hour to 3 hours.

At the end of that period, after most of the cyclics have been stripped out, there is present the low molecular weight linear silicone fluid of formula (1) which is used in the hydraulic silicone mixture of the present invention. The cyclics are stripped out of the original fluid mixture so as to raise the boiling point and the flash point and the chemical stability of the linear fluid and also to obtain better viscosity control. As is known, cyclics have a low boiling point and as a result, if a large amount of cyclics were unduly present in the final linear fluid, they would tend to evaporate off at elevated temperatures and, in addition, lower the flash point and the boiling point of the final linear fluid product.

Thus, as a result of the above process, there is obtained a linear silicone fluid having formula (1), wherein the average silicone polymer molecule in the fluid has 30 to 100 silicon atoms and wherein the resulting silicone fluid has a viscosity that may vary from 20 to 500 centistokes and, more preferably, 20 to 100 centistokes at 25° C. Thus, this fluid is used either in the broad concentration or the more narrow concentration ranges indicated above so as to obtain a final hydraulic fluid having the desired properties and advantages of both the linear fluid of formula (1) and a hydrocarbonoxy-containing fluid defined above in the specification, that is, a fluid with high flash point, high chemical stability, high temperature stability, high boiling point, compatible with water and a hydraulic fluid that is also miscible wth other silicone fluids and, more partcularly, with commercial glycol-based polyether brake fluids and, in addition, can be produced economically and efficiently.

It of course can be understood as specified above, that various types of additives can be added to this basic silicone fluid mixture. Thus, even though the above hydraulic silicone fluid mixture has acceptable viscosity at a temperature as low as −40° C., nevertheless, for some purposes in the use of a hydraulic fluid and, more particularly a brake fluid in arctic areas, it is desirable that the brake fluid have a low viscosity at temperatures as low as −58° C.

Thus, to the present silicone fluid mixture there may be added a third silicone fluid so that the resulting fluid mixture will have acceptable viscosity at temperatures even as low as −58° C. This additional silicone fluid which may be referred to as a pour depressant additive or a viscosity depressant additive, is a branched chain silicone fluid and generally comprises 5 to 10 mole percent of polymeric units of $R_3^{11}SiO_{1/2}$ units, 80 to 91 mole percent of $R_2^{11}SiO$ polymeric units and 4 to 10 mole percent of $R^{11}SiO_{3/2}$ polymeric units. This fluid has a viscosity of 5 to 100 centistokes at 25° C. and, more preferably, a viscosity of 25 to 50 centistockes at 25° C. In the above formulas of the units, $R^{11}$ is as defined previously and, more preferably, it is selected from lower alkyl radicals and phenyl radicals. More preferably, the $R^{11}$ radical is totally selected from lower alkyl radicals such as methyl, ethyl, etc. This depressant is preferably used at a concentration in the silicone fluid mixture of 1 to 20 percent by weight of the linear fluid polymer of formula (1) and, more preferably, at a concentration of 2 to 10 percent by weight of the linear fluid polymer of formula (1) present in the silicone fluid mixture. Within the preferred range of 2 to 10 percent by weight or even within the broad range defined above, the pour point depressant fluid has the desirable property of allowing the silicone fluid mixture to have a viscosity of generally 100 to 600 centistokes at −58° C.

Such a fluid is prepared in much the same way as the linear silicone fluid of formula (1). Thus, there is preferably hydrolyzed a mixture of organohalosilanes where there is present in said mixture of organohalosilanes 80 to 91 mole percent of $R_2^{11}SiX_2$ units, 5 to 10 mole percent of $R_3^{11}SiX$ and 4 to 10 mole percent of $R^{11}SiX_3$, which mixture of organohalosilanes will give the desired fluid having the units defined above. Such a mixture of organohalosilanes is hydrolyzed by adding them to water and, particularly, again as in the prior hydrolysis, 1 per part of organohalosilanes is added 3 to 6 parts of water. An excess of water other than that needed for complete hydrolysis is used in order to insure a complete hydrolysis of the organohalosilanes. The hydrolysis is preferably carried out at a temperature of 30° to 70° C., although it may be carried out at room temperature. Although elevated temperatures, such as 70° C., increase the reaction rate of the hydrolysis, such elevated reaction temperatures are undesirable in that some of the organohalosilanes may be evaporated off unless the system is enclosed.

In the hydrolysis no solvent is used since the presence of a solvent, and particularly an organic solvent, results in the formation of cyclic siloxanes which are undesirable in the final silicone fluid polymer. During the hydrolysis reaction, hydrogen chloride gas is formed which is continually given off. Thus, to facilitate the removal of such hydrogen chloride gas since such gas is undesirable in the final silicone polymer, a vacuum system may be used. The addition of the organohalosilanes to the water at the reaction temperature indicated above is usually carried out in a period of time about ½ hour to 2 hours. After the hydrolysis is complete, there is formed a layer of the silicone polymer and a layer of water. The water layer is drawn off and the silicone polymer layer is washed several times with water to remove as much hydrogen chloride gas as possible, which gas may be entrapped in the silicone polymer. Since it is desirable that there be no hydrogen chloride gas present in the polymer since the presence of such an acid degrades the polymer, the trace amounts of acid still left in the polymer are neutralized by the addition of small amounts of a common base, such as sodium bicarbonate. The salts that are formed by this neutralization process may then be removed by filtering the polymer through a common clay filter or diatomaceous earth filter such as Celite.

At this point in the process, it is desirable to equilibrate the resulting fluid polymer that is formed so as to create in the silicone fluid a larger amount of silicone molecules being in close proximity to the average molecular weight of the viscosity depressant fluid, as was done in the case of the linear fluid of formula (1). Thus, in order to do this as before, one of the common equilibration catalysts is added and particularly one to 2 percent by weight of the fluid of Filtrol or an acid such as toluene sulfonic acid. Then the resulting fluid with the catalyst therein is desirably heated to a temperature in the range of above 150° C. and, more particularly, in the range of 150° to 200° C. for 2 to 6 hours to accomplish the equilibration of the viscosity depressant fluid. At the end of that period, the fluid mixture is cooled and if the acid treated Fullers Earth catalyst is used, it may simply be filtered out. In the case of a liquid acid catalyst, the acid may be neutralized with a common base, such as sodium bicarbonate, and then the resulting salts that are formed are filtered out utilizing a filter such as a Celite or a common type of clay filter. The viscosity depressant silicone fluid may be desirably heated to a temperature of 200° C. and as high as 280° C. to remove by stripping most of the cyclic siloxanes present in the viscosity depressant silicone fluid. The presence of such cyclic siloxanes lower the boiling point, flash point and chemical stability of the fluid and the silicone fluid mixture to which it is to be added.

Thus, using the above described process, there is obtained a pour point depressant silicone fluid within the preferred viscosity range, that is 10 to 100 centistokes at 25° C., which may have 2 to 1,000 silicon atoms in the individual polymer chains, wherein most polymer chains have 30 to 100 silicon atoms.

It must be remembered in the above hydrolysis procedure as in the prior hydrolysis procedure, it is preferred not to use any organic solvent either in the hydrolysis or in the equilibration. This results in the enhanced formation of cyclics which are undesirable in the final product.

As has been stated previously, there may be added as little as 1% by weight of this viscosity depressant silicone fluid based on the weight of the linear fluid and this small amount of viscosity depressant fluid will lower the viscosity somewhat at excessively low temperatures. However, for most effective utilization of this viscosity depressant fluid, it is preferred to add from 2 to 10 percent and as much even as 20 percent by weight of the linear fluid to have the desirable effect on the viscosity of the resulting hydraulic fluid mixture at inordinately low temperatures.

As may be appreciated, the linear polymer fluid of formula (1) does not cause certain rubbers to swell and particularly types of rubbers used in the hydraulic brake systems of automobiles. In fact, in some cases it may cause the rubber to shrink. It should be noted that glycol-based polyether fluids normally cause the rubbers used in automobile hydraulic brake systems to swell, which swelling is relied upon in the braking system for forming good seals. Thus, in the most preferred embodiment of the present case where there is present 80 to 95 percent by weight or more of the linear silicone fluid, it is necessary to add an additive to the hydraulic fluid mixture so that it will have the proper rubber swell properties. Such a rubber swell additive is preferably selected from certain inert organic solvents such as mineral oil, cyclohexane, octane, heptane, benzene, xylene and toluene and certain monoesters and diesters. The monoesters and diester rubber swell additives are preferred since they have a thermal stability, that is, a high temperature stability that approaches the stability of the silicone fluids in the silicone fluid mixture.

Preferably, there is added 1 to 10 percent by weight of such a rubber swell additive based on the weight of the total silicone fluid mixture which may comprise either a combination of the linear silicone polymer fluid of formula (1) and the hydrocarbonoxy-containing silicone fluid or a combination of the hydrocarbonoxy-containing silicone fluid, the linear silicone fluid and the viscosity depressant silicone fluid. A more preferred range for the concentration for the diester or the monoester is 1 to 6 percent by weight of the total hydraulic fluid. It should be pointed out that the most preferred compounds are the diesters. Generally, the diesters and monoesters that may be used as rubber swell additives in the hydraulic fluid of the present invention are selected from compounds of the formula,

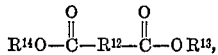

and the formula,

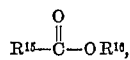

wherein $R^{13}$ and $R^{14}$ are selected from the class consisting of monovalent hydrocarbon radicals and halogenated monovalent hydrocarbon radicals of 4 to 15 carbon atoms, $R^{15}$ and $R^{16}$ are defined as $R^{13}$ and $R^{14}$, and $R^{12}$ is selected from divalent hydrocarbon radicals and halogenated divalent hydrocarbon radicals of 5 to 10 carbon atoms. Preferably, $R^{13}$ and $R^{14}$, as well as $R^{15}$ and $R^{16}$ are selected from alkyl radicals of 5 to 10 carbon atoms, such as octyl, nonyl, etc. Also, the radical $R^{12}$ is preferably selected from alkylene hydrocarbon radicals and halogenated alkylene hydrocarbon radicals of 5 to 10 carbon atoms. The most preferred compounds coming within the general formula of the diester given above are dioctyl azelate, dioctyl adipate and dioctyl subicate. The above three specific examples of diesters are the most preferred diesters for use as rubber swell additives in the hydraulic fluid mixture of the present invention.

Although the silicone hydraulic fluid of the present invention comprising the two silicone fluids or three silicone fluids has superior corrosion resistance to metals and rubbers, the particular rubber swell additive that is added may be corrosive to some extent in the case of metals or rubber, that may be used in the hydraulic system and particularly a brake system of an automobile. To retard or inhibit such corrosion effect of the rubber swell additive, there may preferably be added at a concentration of 0.05 to 2 percent by weight of the hydraulic silicone fluid mixture of an anticorrosive additive selected from the class consisting of zinc salts of naphthenic acid and certain other types of amine naphthenate compounds, such as, for instance, phenyl, alpha-naphthylamine. In addition, a propriety amine known by the trademark "Ortholium" may be used as an anticorrosion additive. The propriety amine Ortholium is manufactured by E. I. du Pont de Nemours and Company.

Very generally, the naphthyl amines that may be added as anticorrosive additives in the present composition have the general formula,

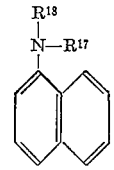

where $R^{17}$ is selected from hydrogen and lower alkyl radicals of 1 to 10 carbon atoms such as methyl, and $R^{18}$ is selected from the class consisting of aryl radicals, alkyl radicals, alkylaryl radicals and halogenated aryl radicals and is most preferably phenyl.

In addition to the above-described most preferred anticorrosion additive there may be added other types of additives that are compatible with the silicone fluids in the silicone fluid mixture of the present invention, so as to improve the properties of the silicone fluid mixture. Thus, there may be added to said silicone fluid mixture an antioxidant compound for inhibiting the oxidation of the silicone fluid mixture due to the possible oxidative effects which may be caused by the presence of the corrosion inhibitors or the rubber swell additives. Preferably, there is generally used 1 to 5 percent by weight of the total silicone fluid mixture of the antioxidant compound. Although various types of antioxidant compounds may be used as additives in the hydraulic fluids of the present invention, the antioxidant compound is preferably selected from the class consisting of,

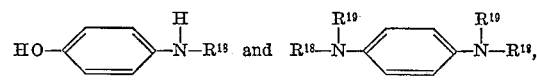

where $R^{19}$ is selected from the class consisting of hydrogen, monovalent hydrocarbon radicals and halogenated monovalent hydrocarobn radicals and is preferably hydrogen or a lower alkyl radical of 1 to 8 carbon atoms, such as methyl, and $R^{18}$ is selected from the class consisting of monovalent hydrocarbon radicals and halogenated monovalent hydrocarbon radicals and is preferably a lower alkyl radical such as isopropyl.

It can also be appreciated that various other types of additives may be added to the silicone fluid mixture of the present invention so as to enhance the properties of the resulting silicone fluid mixture as a hydraulic fluid or as a brake fluid or for the purpose of enhancing a particular desired property in the silicone fluid mixture of the present invention so that it may be used or so that it may be particularly suited or advantageous in a certain type of hydraulic system. It can be appreciated that the basic hydraulic silicone fluid mixture containing the linear silicone fluid of formula (1) and the hydrocarbonoxy-containing silicone fluid has many advantages. It is a superior type of hydraulic fluid and particularly a hydraulic fluid in the braking system of an automobile and particularly has the superior advantages as discussed above, that is, water compatibility, a low viscosity at temperatures even as low as −58° C., superior thermal stability, chemical stability and good compatibility with other types of hydraulic fluids and brake fluids.

In the most preferred embodiment of concentrations at which the hydrocarbonoxy-containing silicone fluid is used in combination with the linear silicone fluid, which most preferred concentrations have economic and processing advantages, it is preferred to add to the combination of the two fluids the third silicone fluid that is the viscosity depressant silicone fluid or the other types of additives defined above in order to enhance and maintain the superior properties of the resulting fluid mixture such that it would have a low viscosity even at low temperatures as low as −58° C. and have a high boiling point, flash point, low evaporation at high temperatures and good compatibility with water. Within the broad concentration of the combination of the linear silicone fluid of formula (1) in combination with the hydrocarbonoxy-containing silicone fluid, the resulting silicone fluid mixture will absorb and be compatible with as much as 6 percent or more of water. In the more preferred concentrations of the hydrocarbonoxy-containing silicone fluid in combination with the linear silicone fluid and possibly the viscosity depressant silicone fluid, the resulting silicone fluid mixture will be compatible and absorb 1 percent by weight of water and perhaps as much as 2 percent by weight of water which may accidently become inserted into the hydraulic system. In addition, at this preferred concentration range, the resulting fluid mixture will have a very high resistance to the absorption of moisture from the air such that it would essentially have no hygroscopicity. It should be pointed out that although in the more general broad range of concentrations of the various silicone fluids in the hydraulic fluid of the present case, that the resulting fluid mixture will be easily compatible with commercial hydraulic fluids and particularly commercial brake fluids such as glycol-based polyethers, that even at the more preferred range of concentrations defined above, that the resulting fluid mixture will still have the necessary amount of compatibility with glycol-based polyether brake fluids so that the resulting mixture of hydraulic fluids will function efficiently in a hydraulic system and particularly in a brake system of an automobile. All parts in the following examples are by weight.

EXAMPLE 1

There is added to a reaction flask 47 parts of

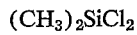

$(CH_3)_2SiCl_2$ and 73 parts of $CH_3SiCl_3$. To this mixture of methylchlorosilanes there is then added slowly with agitation 512 parts of water so as to hydrolyze 65 mole percent of the chlorine atoms present. During such addition of the water, the reaction mixture is not heated and as a result of the hydrogen chloride vapors being given off in the hydrolysis, the reaction temperature is maintained at about 4° C. As soon as the addition of the water takes place in approximately 1½ hours, the hydrolyzate is heated to 30° C. at which point the hydrolysis is essentially complete. To the resulting hydrolyzate there is added 35 parts of toluene and the hydrolyzate is dissolved in the toluene with some agitation. After 15 minutes of stirring the hydrolyzate into the toluene solution, the solution is heated to 50° C. and there is added to it at this temperature 466 parts of 2-methoxy-2-ethoxy ethanol. The resulting ingredients are stirred for 2 hours and the mixture is heated to a temperature of 50° C. At the end of that time, the resulting solution is heated to 158° C. and maintained at that temperature for 2 hours. Then all of the toluene, excess alcohol and cyclic siloxanes are stripped under vacuum. At the end of that time, the solution is brought up to 185° C. for about 5 minutes to remove some of the disiloxanes that have been formed which are deleterious to the desirable viscosity of the fluid of the present invention.

The resulting fluid has a viscosity of 7 centistokes at 25° C. and there is present in said fluid 48 weight percent of 2-methoxy-2-ethoxy ethoxy groups based on the weight of the fluid. This infrared analysis disclosed that the fluid contains the proper proportion of methyl to 2-methoxy, 2-ethoxy ethoxy groups in the silicone polymer fluid.

The linear fluid is prepared by mixing 6.5 parts of $(CH_3)_3SiCl$ and 129 parts of $(CH_3)_2SiCl_2$ and adding this mixture of organosilanes to 400 parts of water. The temperature of the water during the addition process, which is extended for a period of 1 hour, is maintained at 40° to 45° C. After the reaction time period is over, the agitation is discontinued and there is formed a layer of the silicone polymer fluid and a layer of water. The layer of water is drained off. Then the layer of silicone polymer fluid is washed twice with equal volumes of water to remove the trace amounts of hydrogen chloride. After washing with the water, the silicone polymer is tested and found to contain 10 to 100 parts per million of hydrogen chloride. As a result, 10,000 parts per million of sodium bicarbonate is added to the silicone polymer with the necessary agitation. After the agitation is complete, the polymer is filtered through Celite to remove the impurities and salts present in the polymer. At this point there is added to the silicone polymer 1.5 parts of Filtrol and the resulting silicone polymer and Filtrol mixture is equilibrated at a temperature of 180° C. for 3 hours. At the end of the 3 hour period, the silicone polymer was cooled to room temperature and filtered to remove the Filtrol from the polymer. Then the silicone polymer was once more heated to a temperature of 280° C. for 2 hours to remove most of the cyclic siloxanes. At the end of the stripping period and after the polymer had been cooled to room temperature, it is found to have a viscosity of 40 centistokes at 25° C. In such polymer fluid the average silicone polymer chain is found to contain about 40 silicon atoms.

There is prepared a mixture of the linear silicone polymer as prepared above and the hydrocarbonoxy-containing silicone polymer as prepared above, in which mixture there is present 5% of the hydrocarbonoxy-silicone polymer which is prepared above and 95% by weight of the linear fluid polymer prepared above and to this mixture there is added at about 5% by weight of the linear polymer of a pour point depressant silicone fluid containing 5 mole percent of $(CH_3)_3SiO_{1/2}$ units, 89 mole percent of $(CH_3)_2SiO$ units and 6 mole percent of $CH_3SiO_{3/2}$ units, which viscosity depressant silicone fluid has a viscosity of 50 centistokes at 25° C. The resulting silicone fluid mixture will not crystallize at −65° C.

EXAMPLE 2

There is prepared a hydraulic fluid mixture comprising 91.5 parts of the linear fluid polymer as prepared in Example 1, 5 parts of the hydrocarbonoxy-silicone fluid as prepared in Example 1, 2 parts of a rubber swell additive that is dioctyl azealate and 0.5 part of Ortholium.

This blend is then subjected to the following tests which are usually used in determining the desirable properties of brake fluids and which are indicative of the superior physical properties of the hydraulic fluid of the present case when used as a brake fluid. Although these tests enumerated above are common brake fluid tests, it should be mentioned that it is not the intention by the exemplification of such tests to denote that the silicone fluid mixture of the present invention is useful solely in brake systems, but these tests also indicate the superiority of the silicone fluid mixtures of the present invention in hydraulic systems of all kinds.

A dry equilibrium reflux boiling point is used to determine the boiling point of the hydraulic fluid so as to determine how high a temperature range the fluid can be exposed to before it vaporizes. Such a dry equilibrium reflux boiling point determination is carried out by placing 60 ml. of hydraulic brake fluid in a flask and boiling with the specified equilibrium condition in a 100 ml. flask. The average temperature of the boiling fluid at the end of the reflux period is determined and corrected for variations of barometrical pressure if necessary, and this final temperature is the equilibrium reflux boiling point of the hydraulic fluid. The fluid mixture as defined above had an equilibrium reflux boiling point of greater than 600° F.

The wet equilibrium reflux boiling point determination is used to determine how high a temperature the fluid can be raised to before the water that it absorbs from the atmosphere will evaporate out of the fluid and have undesirable side effects in the hydraulic system. Thus, in the present case, a commercial type of glycol-based polyether brake fluid is exposed to 80% relative humidity for 3 days and, during the course of that time, picked up 3% water. The hydraulic silicone fluid as defined above was also exposed to the same atmosphere, that is, one of 80% relative humidity, for 3 days whereupon it picked up 0.05% by weight of water. The wet equilibrium reflux boiling point is carried out by taking 100 ml. sample of the hydraulic silicone fluid mixture as defined above which is humidified as above and then subjected to the equilibrium reflux boiling point test as explained in conjunction with the dry equilibration reflux boiling point test, to determine the equilibrium boiling point. The glycol-based polyether fluid has a boiling point of approximately 300° F. in the above test while the hydraulic silicone fluid as defined above has a boiling point in excess of 700° F.

For the flash point determination which is used to determine to what temperature the fluid can be exposed to before it will burn, the test is to take a test dish which is filled to the specified level with the hydraulic fluid. The fluid temperature is increased rapidly and then at a slower rate as the flash point is approached. At specified intervals, a small test flame is passed across the cup. The lowest temperature at which application of the test flame causes the vapor above the fluid surface to ignite is the flash point. The hydraulic silicone fluid mixture as defined above has a flash point of greater than 450° F.

The kinematic viscosity test is used to determine the viscosity of the fluid both at high and low temperatures. In this test, the determination is made of the time necessary for a fixed volume of the hydraulic fluid to pass through a calibrated gas capillary viscosimeter under an accurately reproducible head and a closely controlled temperature. The kinematic viscosity is then calculated from a measure of flow time in a calibration constant viscosimeter. At −40° C. the hydraulic fluid mixture as defined above had a viscosity of 200 to 700 centistokes. At 212° F. the hydraulic silicone fluid of the present case had a viscosity of 38 centistokes. Then it is necessary to determine whether the hydraulic silicone fluid mixture has the necessary brake fluid stability which comprises a high temperature stability and a chemical stability. In the case of the high temperature stability, a 60 mm. sample of the hydraulic fluid is heated to an appropriate holding temperature and the hydraulic fluid is maintained at the holding temperature for 120±5 minutes. Then for the next 5±2 minutes, the fluid is heated to an equilibrium reflux rate of 1 to 2 drops per second and the temperature is taken. When tested in this test, the hydraulic silicone fluid mixture as defined in this example has a negligible change in temperature during the reflux period, thus indicating it passed the test.

In the case of the chemical stability test, 30±1 ml. of the hydraulic fluid is mixed with 30±1 ml. of SAE compatibility fluid in a boiling flask. The first initial equilibrium reflux boiling point of the mixture is determined by applying heat to the flask so that the fluid is refluxing at 10±2 minutes at a rate in excess of 1 drop per second. Then over the next 15±1 minute, the reflux rate is adjusted and maintained at 1 to 2 drops per second. This rate is maintained for an additional 2 minutes and the average value of the reflux boiling point of the fluid determined. The silicone hydraulic fluid mixture as defined above, when mixed with the compatibility fluid which is a glycol-based polyether fluid, and tested in accordance with the above procedure, suffered a negligible change in its equilibrium reflux boiling point during the course of the above test, showing that the hydraulic silicone fluid mixture as defined has excellent chemical stability.

Another test that may be used is the corrosion test which comprises polishing, cleaning and weighing 6 specified metal corrosion test strips and assembling them in an assembly. This assembly is placed in a standard wheel cylinder cup in a corrosion test jar and immersed in the hydraulic silicone fluid of the present case. The jar is capped and placed in an oven at 100° C. for 120 hours. Upon removal and cooling the strips in the fluid cup are examined. The metal test strips are observed to note whether pitting or etching are discernible, whether there are any crystalline deposits which formed and adhered to the glass jar walls or the surface of the metal strips and whether there is sedimentation in the fluid mixture. The metal strips are weighed for weight loss and other determinations are made with respect to the test. When the hydraulic fluid mixture as defined above was used in this test, the brass strip suffered a weight loss of .1 mg., the iron strip a weight loss of .4 mg., the steel strip a weight loss of .3 mg., the plated steel strip a weight loss of .1 mg. and the aluminum strip no weight loss at all, which weight losses are quite acceptable and showed the superior corrosion resistance of the silicone fluid mixture of the present invention.

Another test that is desirable is the fluidity and appearance at low temperatures test which comprise taking the hydraulic fluid and lowering it to an expected minimum exposure temperature such as −40° C. and the fluid is then observed for gelation, sedimentation and excessive viscosity. The silicone hydraulic fluid mixture as defined in this example with .05% water in it, which is the amount of water it will absorb in 3 days at 80% relative humidity, indicated no crystallization, cloudiness, stratification or sedimentation and upon reversion of the sample bottle in which the test is carried out, the time required for the air bubble to travel to the top of the fluid is less than 10 seconds.

An evaporation test is conducted to determine how much of the fluid will evaporate at elevated temperatures so as to determine the possible creation of undesirable vapor in the hydraulic system by the evaporation of the fluid. In the evaporation test, 25 ml. of the hydraulic fluid is placed in a covered dish for 48 hours at 100° C. in an oven. It is then taken out and is then returned to the oven for 24 hours at 150° C. and this is continued for a total period of 7 days. The non-volatile portion is measured and examined for residues. The residues are then combined and checked for fluidity at −5° C. In the present case there is only a loss of 6% by weight of volatiles after the 7 day period and no formation of residues.

In addition, it is necessary to determine the performance of the silicone hydraulic fluid of this example in conjunction with the water tolerance test to determine how the silicone hydraulic fluid mixture will perform at temperatures of −40° C. to −50° C. There is added to the silicone hydraulic fluid mixture as defined above, 0.5% by weight of water. This water wet fluid is then first lowered to −40° C. and examined for stratification and sedimentation. Upon being subjected to the above test, the silicone fluid mixture containing 0.5% by weight of water has no stratification and no sedimentation and the mixture is present as an emulsion. The fluid is then placed in an oven at 60° C. for 24 hours. On removal after this period, it is again examined for stratification. The mixture was still present as an emulsion and there is no stratification and sedimentation.

Another necessary test is the effect of the hydraulic silicone fluid mixture defined in the above example on styrene butadiene rubber. In this example, four selected styrene butadiene rubber cups are measured and their hardness determined. The cups, two to a jar, are immersed in the hydraulic silicone fluid of the present case wherein one jar is heated for 120 hours at 70° C. and the other for 70 hours at 120° C. At the end of this period the cups are washed and examined for disintegration and they are remeasured and their hardness redetermined. The hydraulic silicone fluid mixture of the present case, when submitted to this test, resulted in not deteriorating the cups. The cups are found to have almost the identical hardness before and after the test. In addition, it was found that the hydraulic silicone fluid mixture of the present case caused an increase due to swelling in the base diameter of the styrene butadiene rubber cups of 0.1 to 0.3 mm., which is an acceptable and desirable swell of styrene butadiene rubber for a commercial brake fluid.

There were other tests which the hydraulic silicone fluid mixture as defined above in this example was subjected to, which tests are common tests for brake fluids, such as the stroking properties test which the hydraulic silicone fluid mixture as defined in this example passed in a superior manner. In addition, there is an oxidation test which is normally used in testing brake fluids and in which the silicone fluid mixture as defined, passed satisfactorily. The above tests and test results indicate quite conclusively the superiority of the hydraulic silicone fluid mixture of this example and, more generally, of the present invention as a hydraulic fluid and, more particularly, as a brake fluid.

EXAMPLE 3

There is prepared a hydraulic silicone fluid mixture containing 15 parts of the hydrocarbonoxy-containing silicone polymer fluid of Example 1, 2 parts of the dioctyl adipate, .2 part of zinc salt of naphthenic acid and 82.5 parts of the linear silicone fluid of Example 1. This silicone fluid mixture, when tested in the brake fluid tests specified in Example 2, passed these tests in a superior manner and the values obtained in these tests were comparable to those enumerated in Example 2. Particularly, only a few test results will be mentioned in this example for the purpose of brevity.

For instance, it was found that the hydraulic silicone fluid mixture of this example was compatible with about 0.5% by weight of water based on the fluid. With this amount of water the fluid is stored at a temperature of −40° C. for 24 hours and then examined for stratification and sedimentation. When so examined, the fluid is found to be in emulsion form and there is no stratification and no sedimentation. The identical fluid is then placed in an oven at 60° C. for 24 hours. After such a test, the fluid is still present in emulsion form and there is present no stratification or sedimentation in the fluid.

The hydraulic silicone fluid mixture of this example was also subjected to the fluidity and appearance at low temperatures test and after being exposed to a temperature of −40° C. the fluid with 0.5% by weight of water in it was observed to be in emulsion form without any gelation, sedimentation, excessive viscosity or thixotropy. In addition, upon reversion of the sample bottle in which the test is carried out, the time required for the air bubble to travel to the top of the fluid is less than 10 seconds.

The corrosion test was also carried out using six specified metal corrosion test strips as described in Example 2. The corrosion test strips immersed in the hydraulic silicone fluid of this example were placed in an oven at 100° C. for 124 hours. Upon observing the metal strips after the test, there is found to be no pitting or etching discernible on the strips and no crystalline deposits are formed or adhered to the glass jar walls or the surface of the metal strips. In addition, there is no discernible sedimentation in the hydraulic silicone fluid mixture used in this test.

Upon weighing the metal strips for weight loss, it is found that the copper strip suffered a weight loss of .3 mg., the brass strip suffered a weight loss of .1 mg., the iron strip suffered a weight loss of .2 mg., the steel strip suffered a weight loss of .3 mg., and the plated steel strip suffered a weight loss of .1 mg. and the aluminum test strip suffered no loss whatsoever, thus indicating the superior corrosion resistance of the hydraulic silicone fluid of this example.

When tested in accordance with the flash point determination defined in Example 2, the fluid has a flash point of 400° F. In addition, when tested in accordance with the dry equilibrium reflux test and the wet equilibrium reflux boiling point test defined in Example 2, the fluid of this example has a dry equilibrium reflux boiling point of greater than 600° F. and a wet equilibrium reflux boiling point of greater than 400° F.

The above examples were given for the purpose of illustrating the advantages of the hydraulic fluid mixtures of the present invention over conventional hydraulic fluids and, more particularly, over conventional brake fluids. It is not intended in any way or manner by these examples to limit the application of the hydraulic silicone fluid mixtures defined in this application solely for use as a brake fluid in an automotive system or as a brake fluid in any other type of vehicle system. Generally, as has been stated previously, the hydraulic silicone fluid mixture as defined in the present specification, may be used in any type of hydraulic system including any type of vehicle.

What is claimed is:

1. A silicone fluid mixture useful as a hydraulic fluid consisting essentially of
  (a) 1 to 80% by weight of the total fluid of a hydrocarbonoxy-containing polymer fluid having 75 to 95 mole percent of polymeric units selected from

and $R_2SiO$ units and mixtures thereof, 5 to 25 mole percent of polymeric units selected from

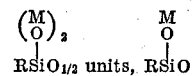

units, and $RSiO_{3/2}$ units and mixtures thereof, with trace amounts of other units selected from the class consisting of 0 to 10 mole percent of $(MO)_3SiO_{1/2}$, $(MO)_2SiO$, $MOSiO_{3/2}$, $SiO_2$, and 0 to 5 mole percent of $R_3SiO_{1/2}$, wherein the molar amount of MO groups present based on the total moles of R and MO groups present may vary from 5 to 95 mole percent wherein the viscosity of the fluid may vary from 5 to 200 centistokes at 25° C., R is selected from the class consisting of monovalent hydrocarbon radicals, halogenated monovalent hydrocarbon radicals and cyanoalkyl radicals of 1 to 8 carbon atoms, M is selected from the class consisting of R—, ROR'—, ROR'OR'—, $R(OC_xH_{2x})_n$—, and

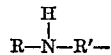

such that R is as previously defined, R' is selected from the class consisting of alkylene radicals and arylene radicals of up to 20 carbon atoms, $x$ varies from 2 to 4 and $n$ is at least 5; and (b) 20 to 99% by weight of the total fluid of a linear polymer siloxane fluid of the formula

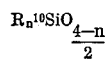

where $n$ varies from 2.0 to 3.0, $R^{10}$ is selected from monovalent hydrocarbon radicals, halogenated monovalent hydrocarbon radicals and cyanoalkyl radicals of 1 to 8 carbon atoms and the viscosity of the linear fluid varies from 20 to 500 centistokes at 25° C.

2. The silicone fluid mixture of Claim 1 wherein there is present 1 to 20% by weight of the linear fluid polymer of a viscosity depressant silicone fluid containing 80 to 91 mole percent of $R_2^{11}SiO$ polymeric units, 5 to 10 mole percent of $R_3^{11}SiO_{1/2}$ polymeric units and 4 to 10 mole percent of polymeric $R^{11}SiO_{3/2}$ units wherein the viscosity of said viscosity depressant fluid varies from 5 to 100 centistokes at 25° C. and $R^{11}$ is selected from the class consisting of lower alkyl radicals of 1 to 8 carbon atoms and phenyl radicals.

3. The silicone fluid mixture of Claim 1 wherein there is present based on the total silicone fluid, 1 to 5% by weight of a rubber swell additive selected from the class consisting of

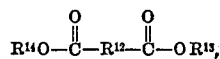

and

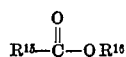

wherein $R^{13}$ and $R^{14}$ are alkyl radicals of 4 to 15 carbon atoms, $R^{15}$ and $R^{16}$ are defined as $R^{13}$ and $R^{14}$ and $R^{12}$ is selected from alkylene radicals and halogenated alkylene radicals of 5 to 10 carbon atoms.

4. The silicone fluid mixture of Claim 3 wherein the rubber swell additive is selected from the class consisting of dioctyl azelate, dioctyl adipate and dioctyl sebacate.

5. The silicone fluid mixture of Claim 1 wherein there is present 0.05 to 2% by weight of the fluid mixture of an anticorrosion additive selected from the class consisting of the zinc salts of a naphthenic acid and a compound of the formula,

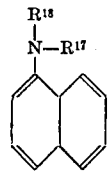

where $R^{17}$ is selected from the class consisting of hydrogen and lower alkyl radicals of 1 to 8 carbon atoms and $R^{18}$ is selected from the class consisting of alkyl radicals of 1 to 6 carbon atoms, and aryl radicals.

6. The silicone fluid mixture of Claim 1 wherein there is present 1 to 5% by weight of the total fluid mixture of an antioxidant compound selected from the class consisting of

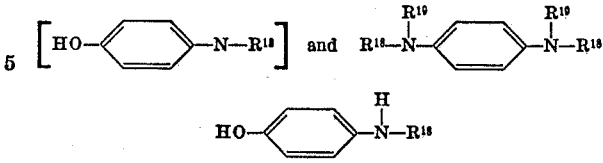

where $R^{19}$ is selected from the class consisting of hydrogen and lower alkyl radicals of 1 to 8 carbon atoms, $R^{18}$ is a lower alkyl radical.

7. The silicone fluid mixture of Claim 1 wherein there is present in said hydrocarbonoxy-containing fluid 20% by weight to 48% by weight of MO groups based on the total weight of the hydrocarbonoxy-containing fluid.

8. The silicone fluid mixture of Claim 1 wherein M is preferably 2-methoxy-2-ethoxy ethylene and R is methyl.

9. The silicone fluid mixture of Claim 1 wherein said linear polymer fluid is present at a concentration of 5 to 20% by weight and $R^{10}$ is selected from the class consisting of methyl, phenyl and vinyl and the viscosity of the linear fluid varies from 20 to 100 centistokes at 25° C.

10. A process for transmitting force through a hydraulic system having hydraulic activating means, hydraulic activated means and hydraulic line means connecting said hydraulic activating means with said hydraulic activated means comprising substantially filling said hydraulic activating means, said hydraulic lines and said hydraulic activated means with a silicone fluid mixture comprising (a) 1 to 80% by weight of the total fluid of a hydrocarbonoxy-containing polymer fluid having 75 to 95 mole percent of polymeric units selected from

units and $R_2SiO$ units and mixtures thereof, 5 to 25 mole percent of polymeric units selected from

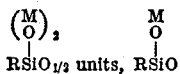

units and $RSiO_{3/2}$ units and mixtures thereof, with trace amounts of other units selected from the class consisting of 0 to 10 mole percent of $(MO)_3SiO_{1/2}$, $(MO)_2SiO$, $MOSiO_{3/2}$, $SiO_2$ and 0 to 5 mole percent of $R_2SiO_{1/2}$, wherein the molar amount of MO groups present based on the total moles of R and MO groups present may vary from 5 to 95 mole percent wherein the viscosity of the fluid may vary from 2 to 400 centistokes at 25° C., R is selected from the class consisting of monovalent hydrocarbon radicals, halogenated monovalent hydrocarbon radicals and cyanoalkyl radicals of 1 to 8 carbon atoms, M is selected from the class consisting of R—, ROR'—, ROR'OR'—, $R(OC_xH_{2x})_n$—, and

such that R is as previously defined, R' is selected from the class consisting of alkylene radicals and arylene radicals of up to 20 carbon atoms, $x$ varies from 2 to 4 and $n$ is at least 5; and (b) 20 to 99% by weight of the total fluid of a linear polymer silicone fluid of the formula,

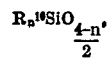

where $n$ varies from 2.0 to 3.0, $R^{10}$ is selected from monovalent hydrocarbon radicals, halogenated monovalent hydrocarbon radicals and lower cyanoalkyl radicals of 1 to 8 carbon atoms and the viscosity of the linear fluid varies from 20 to 500 centistokes at 25° C.

11. The process of Claim 10 wherein there is present 1 to 20% by weight of the linear fluid polymer of a viscosity depressant silicone fluid containing 80 to 91 mole percent of $R_2^{11}SiO$ polymeric units, 5 to 10 mole percent of $R_3^{11}SiO_{1/2}$ polymeric units and 4 to 10 mole percent of $R^{11}SiO_{3/2}$ polymeric units wherein the viscosity of the branched chain fluid varies from 5 to 100 centistokes at 25° C. and $R^{11}$ is selected from the class consisting of lower alkyl radicals of 1 to 8 carbon atoms and phenyl radicals.

12. The process of Claim 10 wherein there is present based on the total silicone fluid, 1 to 6% by weight of a rubber swell additive selected from the class consisting of $$[R^{14}O-C-R^{12}-C-OR^{13}]$$
$$\overset{O}{\|} \quad \overset{O}{\|}$$
$$R^{14}O-C-R^{12}-C-OR^{13}$$

and $$\overset{O}{\|}$$
$$R^{14}-C-OR^{16},$$

wherein $R^{13}$ and $R^{14}$ are alkyl radicals of 4 to 15 carbon atoms, $R^{15}$ and $R^{16}$ are defined as $R^{13}$ and $R^{14}$, and $R^{12}$ is selected from alkylene radicals and halogenated alkylene radicals of 5 to 10 carbon atoms.

13. The process of Claim 12 wherein the rubber swell additive is selected from the class consisting of dioctyl azelate, dioctyl adipate and dioctyl sebacate.

14. The process of Claim 10 wherein there is present 0.05 to 2% by weight of the fluid mixture of an anticorrosion additive selected from the class consisting of the zinc salts of naphthenic acid, and a compound of the formula,

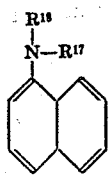

where $R^{17}$ is selected from hydrogen and lower alkyl radicals of 1 to 8 carbon atoms and $R^{18}$ is selected from the class consisting of alkyl radicals of up to 6 carbon atoms and aryl radicals.

15. The process of Claim 10 wherein there is present 1 to 5% by weight of the total fluid mixture of an antioxidant compound selected from the class consisting of

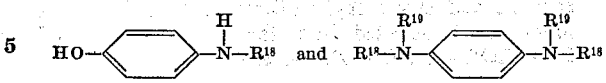

where $R^{19}$ is selected from the class consisting of hydrogen and lower alkyl radicals of 1 to 8 carbon atoms, $R^{18}$ is a lower alkyl radical.

16. The process of Claim 10 wherein there is present in said hydrocarbonoxy-containing fluid 20% by weight to 48% by weight of MO groups based on the total weight of the hydrocarbonoxy-containing fluid.

17. The process of Claim 10 wherein M is preferably 2-methoxy-2-ethoxy ethylene and R is methyl.

18. The process of Claim 10 wherein said linear polymer fluid is present at a concentration of 5 to 20% by weight of the two silicone fluids, $R^{10}$ is selected from the class consisting of methyl, phenyl and vinyl and the viscosity of the linear fluid varies from 20 to 100 centistokes at 25° C.

References Cited

UNITED STATES PATENTS

| | | | |
|---|---|---|---|
| 3,317,429 | 5/1967 | Cekada et al. | 252—78 |
| 3,425,750 | 2/1969 | Dane | 303—6 |
| 3,707,501 | 12/1972 | Gentit et al. | 252—78 |
| 3,669,884 | 6/1972 | Wright | 252—389 X |
| 2,389,805 | 11/1945 | McGregor et al. | 252—49.6 X |
| 2,398,187 | 4/1946 | McGregor et al. | 252—78 |
| 2,447,483 | 8/1948 | Baker et al. | 252—78 X |
| 2,624,749 | 1/1953 | Bunnell | 260—448.8 R |
| 2,689,859 | 9/1954 | Burkhard | 252—78 X |
| 2,746,926 | 5/1956 | Barry | 252—78 |
| 2,877,184 | 3/1959 | Ragborg | 252—78 |
| 2,947,772 | 8/1960 | Eynon et al. | 252—78 X |
| 2,995,590 | 8/1961 | Peeler et al. | 252—78 X |
| 2,995,592 | 8/1961 | Peeler et al. | 252—78 X |
| 3,185,663 | 5/1965 | Prober | 252—78 X |

LEON D. ROSDOL, Primary Examiner

H. A. PITLICK, Assistant Examiner

U.S. Cl. X.R.

260—448.8 R